(12) United States Patent
Accursi et al.

(10) Patent No.: US 11,540,664 B2
(45) Date of Patent: Jan. 3, 2023

(54) APPARATUS FOR MAKING A BEVERAGE, CAPSULE FOR MAKING A BEVERAGE AND COMBINATION OF AN APPARATUS AND AT LEAST TWO DIFFERENT CAPSULES FOR MAKING BEVERAGES

(71) Applicant: CAFFITALY SYSTEM S.P.A., Gaggio Montano (IT)

(72) Inventors: Giovanni Accursi, Alto Reno Terme (IT); Maurizio Diamanti, Castel di Casio (IT)

(73) Assignee: CAFFITALY SYSTEM S.P.A., Gaggio Montano (IT)

( * ) Notice: Subject to any disclaimer, the term of this patent is extended or adjusted under 35 U.S.C. 154(b) by 453 days.

(21) Appl. No.: 16/612,649

(22) PCT Filed: May 22, 2018

(86) PCT No.: PCT/IB2018/053604
§ 371 (c)(1),
(2) Date: Nov. 11, 2019

(87) PCT Pub. No.: WO2018/215926
PCT Pub. Date: Nov. 29, 2018

(65) Prior Publication Data
US 2020/0205607 A1    Jul. 2, 2020

(30) Foreign Application Priority Data

May 24, 2017 (IT) .......................... 102017000056286

(51) Int. Cl.
*A47J 31/52* (2006.01)
*A47J 31/46* (2006.01)
(Continued)

(52) U.S. Cl.
CPC ....... *A47J 31/5253* (2018.08); *A47J 31/3633* (2013.01); *A47J 31/407* (2013.01);
(Continued)

(58) Field of Classification Search
CPC .. A47J 31/5253; A47J 31/3633; A47J 31/407; A47J 31/4492; A47J 31/468; A47J 31/56; A47J 31/52; B65D 85/8043
See application file for complete search history.

(56) References Cited

U.S. PATENT DOCUMENTS 3,537,384 A * 11/1970 Siegfried .............. A47J 31/545
                                                        99/302 R
4,583,449 A *  4/1986 Dangel ............... A47J 31/4496
                                                        99/302 R
(Continued)

FOREIGN PATENT DOCUMENTS

EP        1554958 B1    9/2013
WO    2014006527 A2    1/2014
(Continued)

*Primary Examiner* — Sean M Michalski
(74) *Attorney, Agent, or Firm* — Pearne & Gordon LLP

(57) ABSTRACT

An apparatus for making a beverage using a capsule (3), (4), wherein, respectively for a first and a second type of beverage selectable, first data and second data are saved which comprise a first and a second supplying start temperature value, a first and a second steady-state supplying temperature value, a first and a second total supplying time and a first and a second activation mode for the pump (16), and wherein an electronic control unit (19) is programmed to cause the supplying respectively of the first and second type of beverage using the first data and the second data for controlling a pump (16) and a boiler (17); wherein the first total supplying time comprises a pre-infusion time, a wait time and an infusion time; and wherein the first activation mode comprises an electricity supply to the pump (16) with an average power that is greater than that in the second (Continued)

activation mode. A capsule is also claimed, which is usable with the apparatus and the system which comprises the apparatus and two different capsules for making two different beverages.

26 Claims, 9 Drawing Sheets

(51) Int. Cl.
 *A47J 31/36* (2006.01)
 *A47J 31/40* (2006.01)
 *A47J 31/44* (2006.01)
 *A47J 31/56* (2006.01)
 *B65D 85/804* (2006.01)

(52) U.S. Cl.
 CPC ......... *A47J 31/4492* (2013.01); *A47J 31/468* (2018.08); *A47J 31/56* (2013.01); *B65D 85/8043* (2013.01)

(56) References Cited

U.S. PATENT DOCUMENTS

| | | | |
|---|---|---|---|
| 5,325,765 A | 7/1994 | Sylvan et al. | |
| 5,408,917 A * | 4/1995 | Lussi | H02J 3/14 99/323.1 |
| 6,161,469 A * | 12/2000 | Rolla | A47J 31/54 99/302 R |
| 6,786,134 B2 * | 9/2004 | Green | A47J 31/3633 99/289 P |
| 6,829,981 B2 * | 12/2004 | Lassota | A47J 31/46 99/305 |
| 7,325,479 B2 * | 2/2008 | Laigneau | A47J 31/0647 99/295 |
| 8,327,754 B2 * | 12/2012 | Kirschner | B65D 85/8046 426/77 |
| 8,431,175 B2 * | 4/2013 | Yoakim | B65D 85/8058 99/302 C |
| 8,505,440 B2 * | 8/2013 | Kirschner | A23F 5/10 426/77 |
| 8,991,795 B2 * | 3/2015 | Studor | B01F 35/1452 261/33 |
| 9,439,532 B2 * | 9/2016 | Crarer | A47J 31/407 |
| 9,527,661 B2 * | 12/2016 | Fu | B65D 65/466 |
| 9,598,230 B2 | 3/2017 | Schmed et al. | |
| 2003/0079613 A1 * | 5/2003 | Williamson | A47J 31/52 99/280 |
| 2005/0150390 A1 | 7/2005 | Schifferle | |
| 2005/0150391 A1 | 7/2005 | Schifferle | |
| 2007/0148290 A1 | 6/2007 | Ternite et al. | |
| 2009/0159612 A1 * | 6/2009 | Beavis | A47J 31/40 222/145.5 |
| 2010/0077928 A1 | 4/2010 | Schmed et al. | |
| 2011/0113968 A1 | 5/2011 | Schmed et al. | |
| 2014/0010926 A1 | 1/2014 | Digiuni | |
| 2014/0202338 A1 | 7/2014 | Remo et al. | |
| 2015/0216353 A1 | 8/2015 | Polti | |
| 2015/0329281 A1 | 11/2015 | Digiuni et al. | |
| 2016/0311608 A1 | 10/2016 | Accursi | |
| 2016/0338527 A1 * | 11/2016 | Burrows | A47J 31/56 |
| 2017/0068878 A1 * | 3/2017 | Flick | G06K 19/067 |
| 2018/0020868 A1 * | 1/2018 | Rognoni | A47J 31/4485 99/293 |
| 2021/0300804 A1 * | 9/2021 | Broga | A47L 15/4229 |

FOREIGN PATENT DOCUMENTS

| | | |
|---|---|---|
| WO | 2015087180 A1 | 6/2015 |
| WO | 2018167641 A1 | 9/2018 |

* cited by examiner

APPARATUS FOR MAKING A BEVERAGE, CAPSULE FOR MAKING A BEVERAGE AND COMBINATION OF AN APPARATUS AND AT LEAST TWO DIFFERENT CAPSULES FOR MAKING BEVERAGES

This invention relates to an apparatus for making a beverage, a capsule for making a beverage and a combination of an apparatus and at least two different capsules for making beverages.

In recent years, making beverages, in particular but not only coffee, using suitable apparatuses which use powdered food substances contained in capsules, is becoming increasingly widespread.

Therefore, over time, apparatuses have been developed which are able to make many different types of beverages.

However, to the best of this Applicant's knowledge, no prior art apparatus is currently able on its own to make all types of beverages, at least of good quality. In fact, it should be considered that the beverages have very different characteristics, so that it is difficult to make all types of beverages using a single apparatus. But that is not the only issue. In fact, as far as this Applicant knows, currently there is no apparatus on the market able on its own to make all types of coffee. In fact, the generic term "coffee" covers very different products ranging from typical Italian espresso coffee to black coffee (or American coffee) typical particularly in the United States. Although both of these "coffees" are made by infusion of coffee powder or ground coffee in hot water, they could not be two more different beverages.

Espresso coffee does not normally exceed 40/50 ml of product (the quantity is usually between 20 and 40 ml), has a dense, lasting surface crema, without large bubbles and which is several millimetres thick, and it is relatively strong (usually between 4°Bx and 7°Bx—as is known, Brix is a measurement of substances in the solid state dissolved in a liquid, and one degree Brix—°Bx—in terms of weight corresponds to one part solid substance in one hundred parts solution).

In contrast, black coffee, or American coffee, usually consists of a relatively large quantity of liquid, always greater than 180 ml and which may even be as much as 400 ml (and even one litre if a carafe is being filled), has a surface without crema, and is relatively weak (approximately 1°Bx).

Hereinafter when reference is make respectively to espresso coffee and to black coffee or American coffee, it will mean beverages with the characteristics just described.

In many aspects, American coffee is similar to another type of coffee known as "filter coffee" and which is traditionally widespread in Northern Europe. Although black coffee and filter coffee are often confused due to their similarities (no crema, low strength) they are in fact considerably different at least in terms of the quantities of coffee obtained using the same dose of powdered or ground coffee. In fact, a good filter coffee usually provides a total quantity of beverage that is less than 180 ml, that is to say, equivalent to around half the quantity that can be provided for an American coffee. In terms of making the coffee, whilst espresso coffee is extracted at high pressures (up to 12 bar), traditional extraction of black coffee, and of filter coffee, should take place by simple percolation of the hot water through the coffee powder simply under the effect of gravity.

As already indicated, there are currently no known apparatuses using capsules which are set up to be able to supply a choice of espresso coffee and black coffee. In contrast, over the years some apparatuses have been developed for making a choice of espresso coffee and filter coffee. For example, the apparatus in patent EP 1 554 958 by this Applicant.

However, tests carried out by the Applicant have shown that an apparatus made in accordance with EP 1 554 958 is not able to make a black coffee of suitable quality, irrespective of the characteristics of the capsules used (that is to say, using either capsules designed for espresso coffee, or capsules designed for filter coffee, or capsules designed for other types of coffee such as caffè creme—cream coffee).

Furthermore, it should be noticed that in order to optimise the making of each type of beverage, over the years the various manufacturers have gradually developed new capsules or have modified the existing capsules, each time attempting to modify one or other characteristics of the coffee supplied (for example, the presence or absence of crema, the strength, etc.). Despite that, at present few capsules have actually been brought to market for making black coffee, and always and only in combination with apparatuses intended only for making an American coffee.

Amongst the most widespread capsules for making American coffee are those marketed by the United States company Keurig Green Mountain, Inc. and described in U.S. Pat. No. 5,325,765, which have a cup-shaped main body made of a multi-layer plastic material, closed at the top by a lid made of plastic material that is thinner and less strong than the main body, and inside which, near the upper edge, a pleated paper filter bag is fixed, this bag being filled with the coffee powder. During supplying, the capsule is pierced at the lid to allow low pressure water to be fed into the capsule and at the base to allow out the beverage formed after the water has passed through the coffee powder. The passage of the beverage, or of the water, from the space where the coffee powder is contained and the space surrounding the filter bag may occur at any point of the filter bag.

Although such capsules allow qualitatively acceptable results to be obtained, they are not without disadvantages.

The main disadvantage is the fact that, during supplying, the wet coffee powder tends both to clog the filtering material of which the bag is constituted, in particular at its lower part, and to become increasingly compacted towards the bottom, creating a kind of plug. Consequently, a predetermined time after the start of supplying, the water that is fed at low pressure into the capsule is no longer able to pass through the coffee powder and tends to go around it and pass through the filter at the band closest to the upper flange. However, when that happens, what reaches the cup is no longer a coffee beverage, but substantially plain hot water.

In this context the technical purpose that forms the basis of this invention is to provide an apparatus for making a beverage, a capsule for making a beverage and a combination of an apparatus and at least two different capsules for making beverages that overcome the above-mentioned disadvantages.

In particular, the technical purpose of this invention is to provide an apparatus for making a beverage, which allows espresso coffee and black coffee to be made, as required.

A further technical purpose of this invention is to provide a capsule for making a beverage that is less subject to the risk of supplying plain hot water rather than coffee even for a short time.

Another technical purpose of this invention is to provide a combination of an apparatus and at least two different capsules for making a choice of two beverages that are very different from each other, that is to say an espresso coffee and a black coffee.

The technical purpose and the aims indicated are substantially achieved respectively by an apparatus, by a capsule and by a combination of the apparatus with two different capsules, in accordance with what is described in the appended claims.

Further features and the advantages of this invention are more apparent in the detailed description below, with reference to several preferred, non-limiting embodiments of an apparatus, of a capsule and of a combination of an apparatus and at least two different capsules for making beverages, illustrated in the accompanying drawings, in which.

Figure 1:
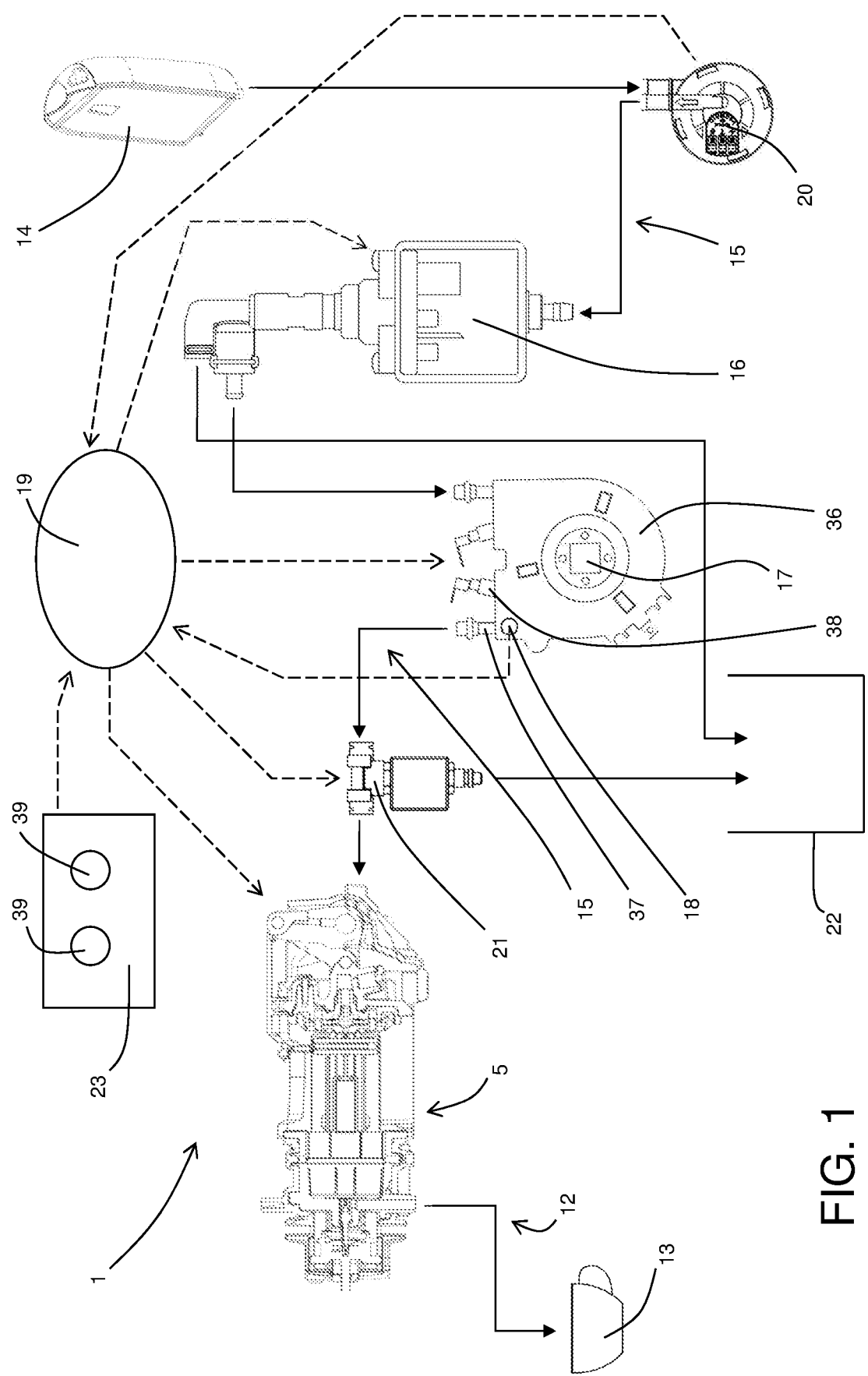
FIG. 1 is a schematic layout of an apparatus according to this invention.
Figure 6:
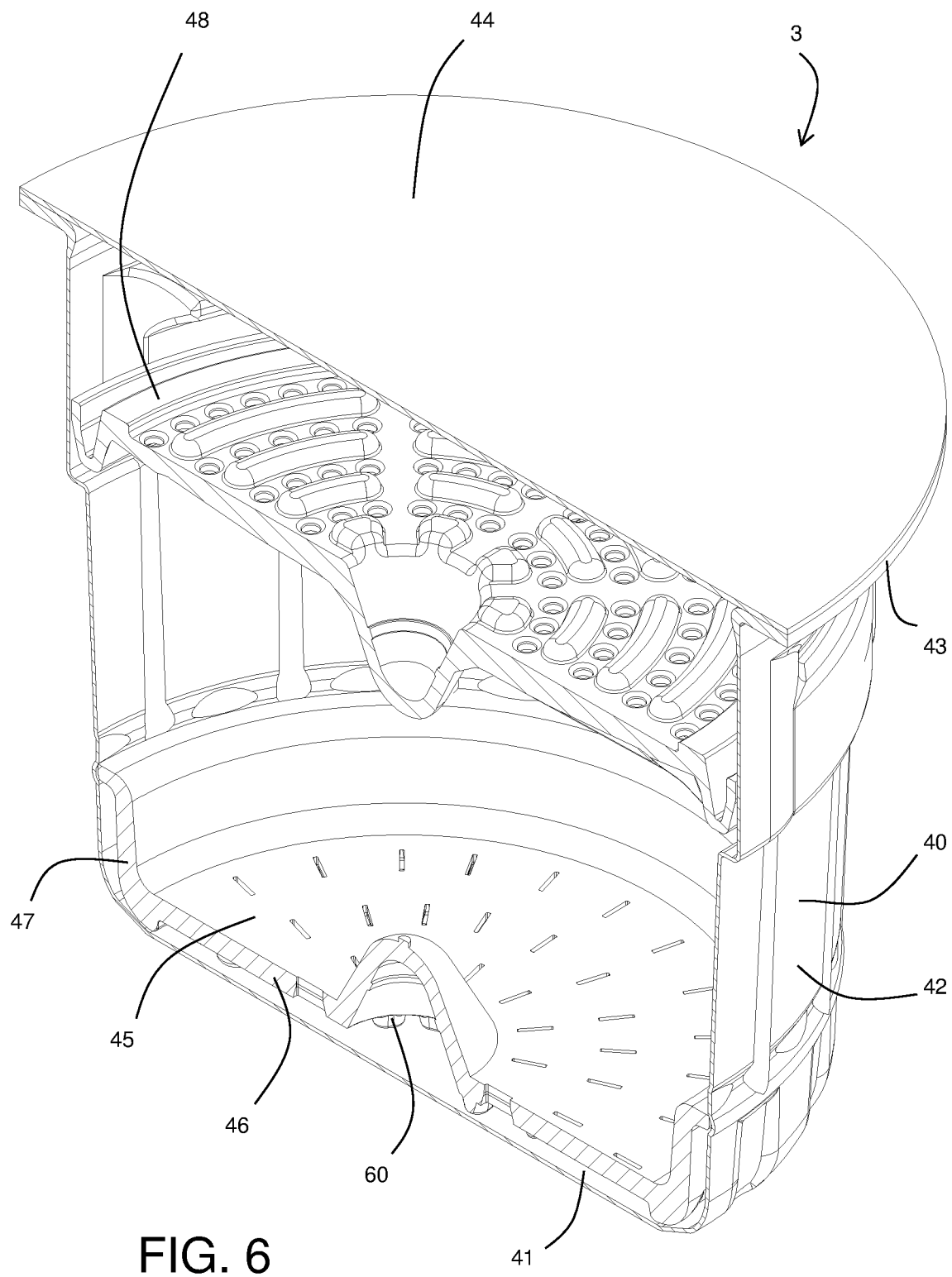
FIG. 6 is an axonometric axial cross-section view, without powdered food substance, of a first capsule usable in combination with the apparatus of FIG. 1.
Figure 7:
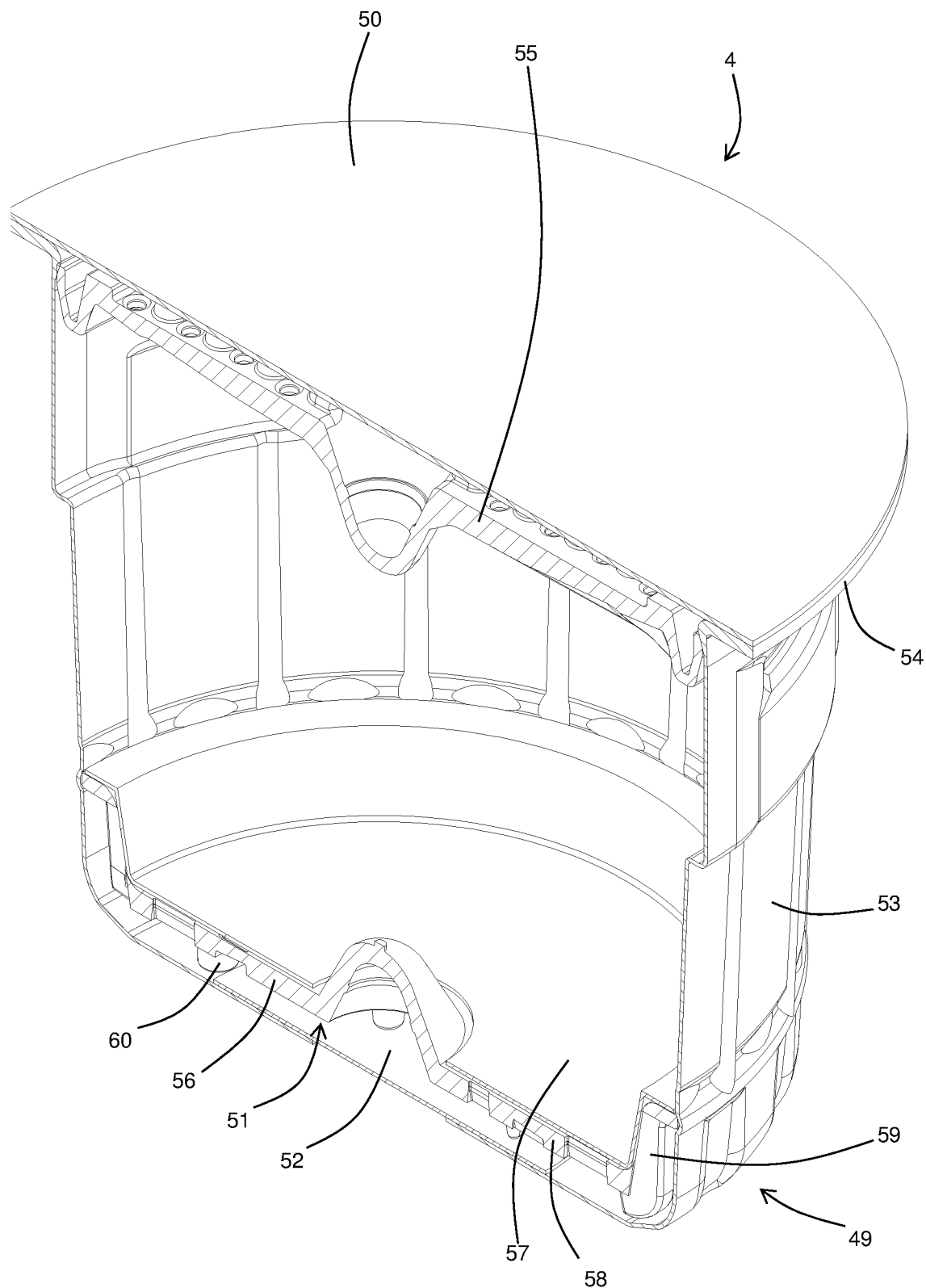
FIG. 7 is an axonometric axial cross-section view, without powdered food substance, of a second capsule according to this invention, usable in combination with the apparatus of FIG. 1.
Figure 8:
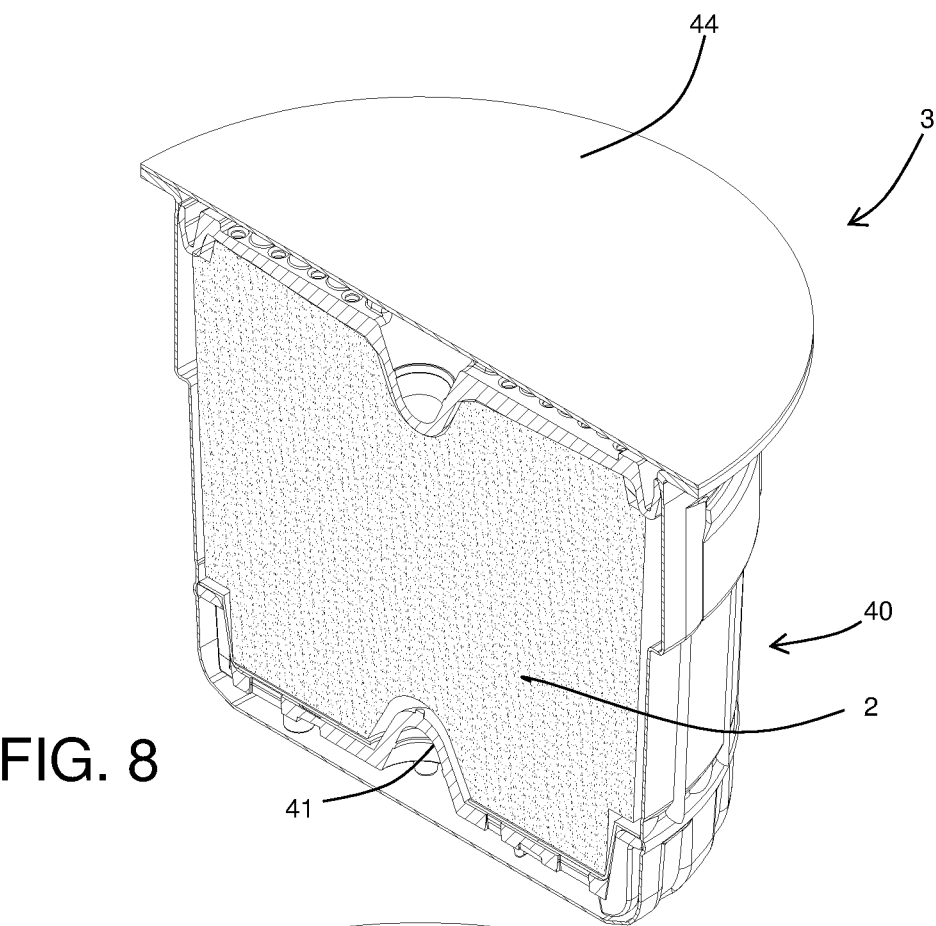
Figure 9:
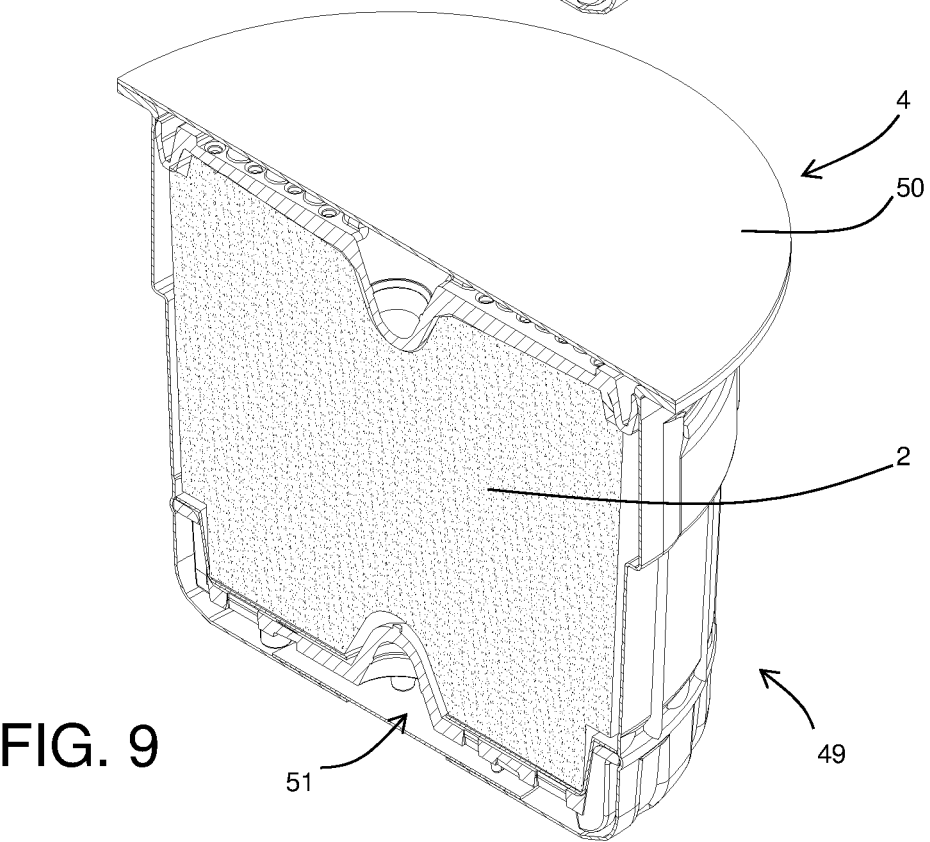
Figure 10:
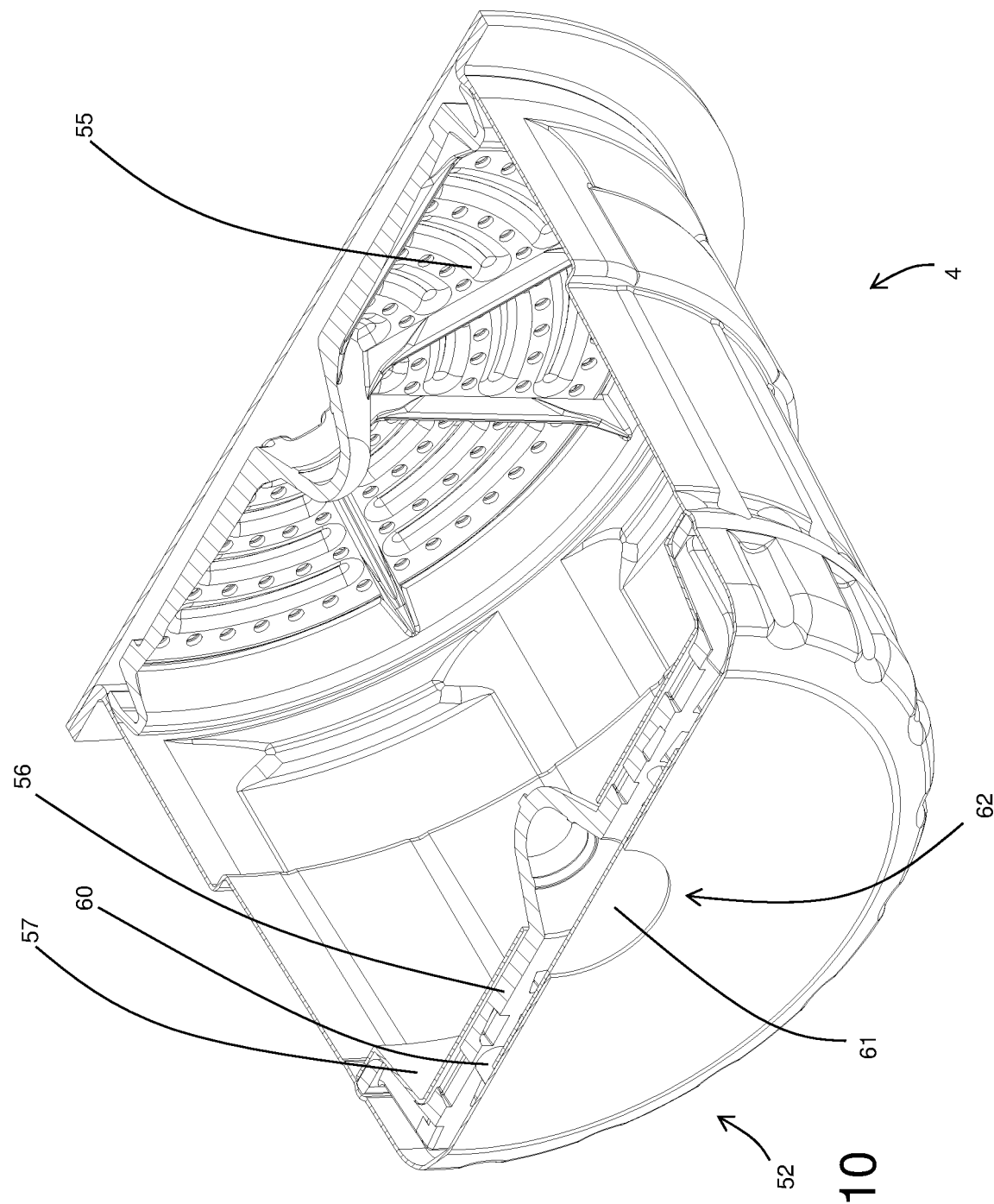
Figure 11:
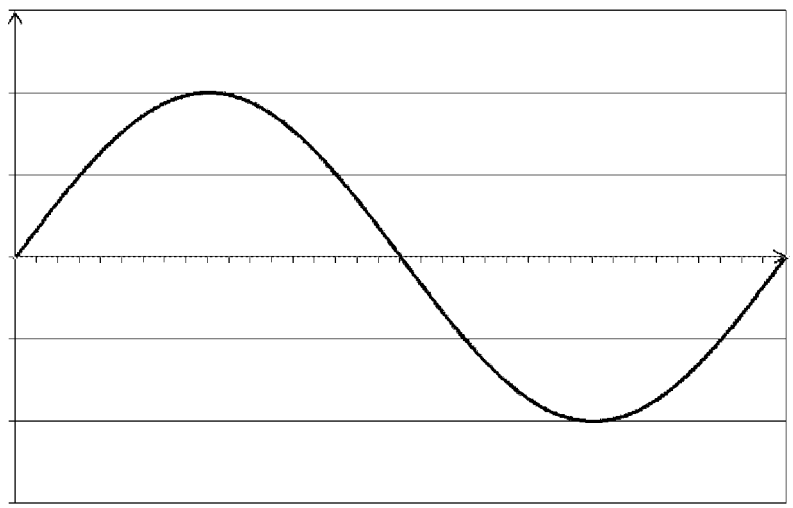
Figure 12:
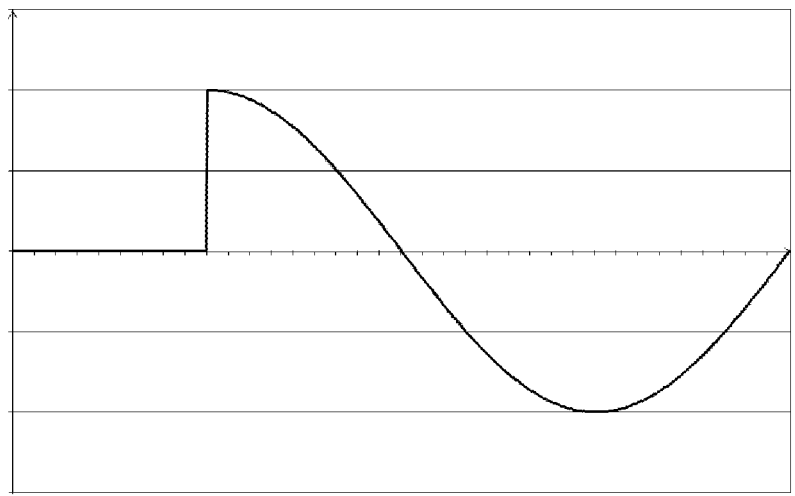

FIGS. 8 and 9 respectively show the capsules of FIGS. 6 and 7 filled with the powdered substance;

FIG. 10 is a bottom view of the second capsule of FIG. 7;

FIG. 11 shows a schematic graph of the trend of the alternating voltage (y-axis) over time (x-axis—overall showing only a time equal to a complete period of voltage oscillation) relative to powering at full power of a pump of the apparatus of FIG. 1; and FIG. 12 shows a corresponding schematic graph of the trend of the alternating voltage over time relative to powering at limited power.

For greater clarity, hereinafter there is first a description of an apparatus made according to this invention. Then a description of several preferred embodiments of capsules usable in the apparatus for allowing the making of different beverages. Finally, the system comprising the combination of the apparatus and the different capsules is described.

As regards the apparatus which is the subject matter of this invention, as already indicated it is an apparatus 1 for making a beverage by passing hot water through a powdered food substance 2 contained in a capsule 3, 4.

Figure 2:
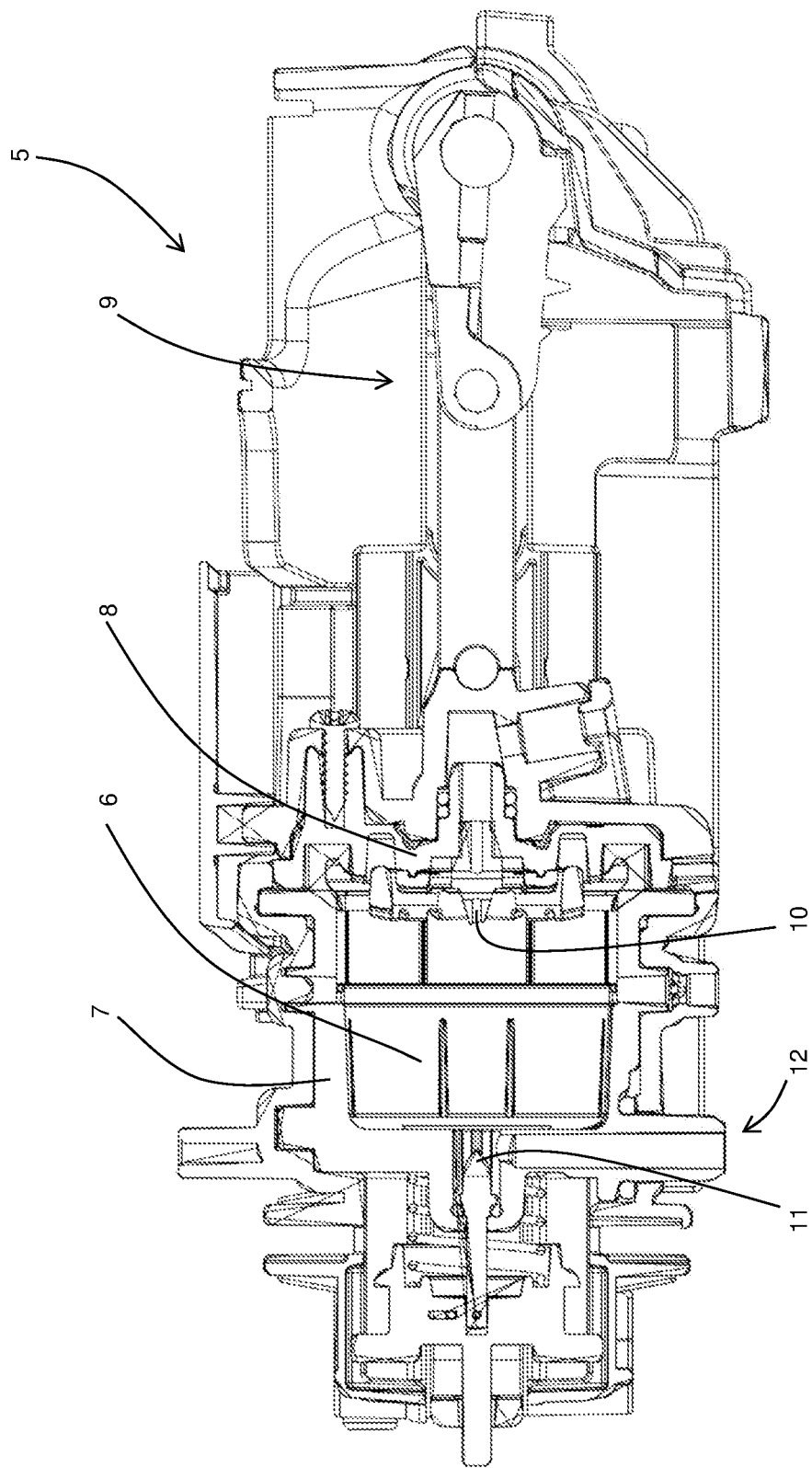
FIG. 2 is an enlarged view of an extraction unit of the machine of FIG. 1 in a closed configuration.
Figure 3:
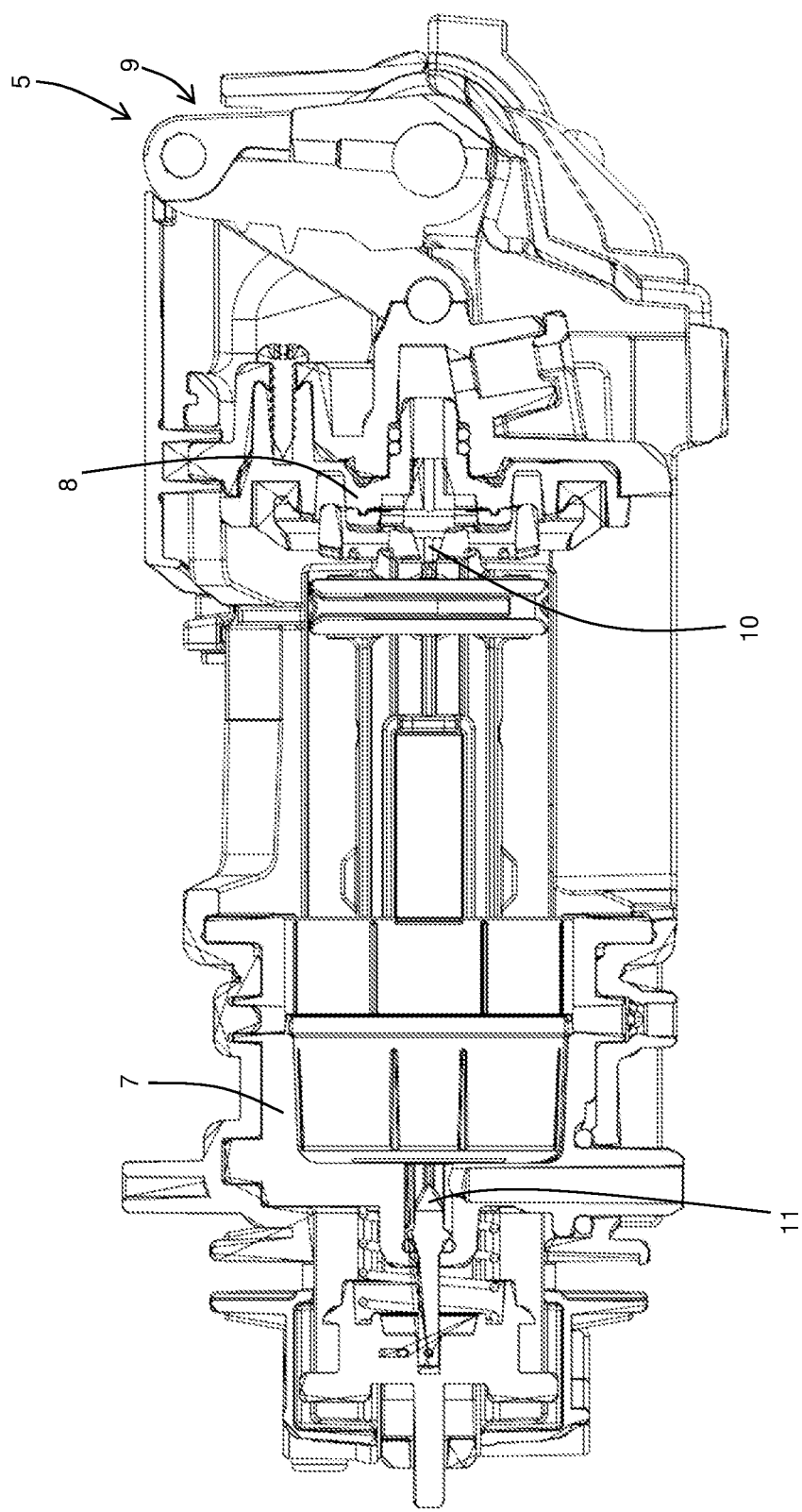
FIG. 3 shows the extraction unit of FIG. 2 in an open configuration.

In the known way, the apparatus 1 comprises an extraction unit 5 which forms an extraction chamber 6 and which is switchable between an open configuration (FIG. 3) and a closed configuration (FIGS. 1 and 2).

When it is in the open configuration, the extraction unit 5 in use allows insertion in, or extraction from, the extraction chamber 6 of a capsule 3, 4 suitable for being contained in the extraction chamber 6.

When it is in the closed configuration, the extraction unit 5 in use may, in contrast, retain a capsule 3, 4 in the extraction chamber 6. Moreover, advantageously, in the closed configuration the unit retains the capsule 3, 4 in a fluidtight way, for preventing the extraction water from going around the capsule 3, 4.

In the embodiment illustrated in the accompanying figures, the extraction unit 5 comprises a first part 7 and a second part 8 at least one of which is movable relative to the other between an away position corresponding to the open configuration of the extraction unit 5, and a near position corresponding to the open configuration. The shifting is guaranteed by a connecting rod—crank mechanism 9 which may either be motor-driven or manually operated.

Both hot water feeding means and beverage evacuating means are joined in the known way to the extraction chamber 6.

Both comprise suitable piercing or cutting elements for making in the capsule 3, 4 passages suitable for allowing water infeed and beverage outfeed. In the embodiment illustrated, the piercing means which are part of the feeding means comprise a spike 10 suitable for piercing the lid of the capsule 3, 4, whilst those which are part of the beverage evacuating means comprise a blade 11 suitable for cutting a bottom wall of the capsule 3, 4.

In general, the beverage evacuating means comprise a duct 12 able to guide the beverage from the extraction chamber 6 to a supplying nozzle below which, in use, the cup 13 to be filled is placed.

The hot water feeding means in turn comprise a tank 14, a feeding duct 15 extending from the tank 14 to the extraction chamber 6, a pump 16 mounted on the feeding duct 15, and a boiler 17 mounted along the feeding duct 15 downstream of the tank 14.

The hot water feeding means further comprise a temperature measuring device 18 associated with the boiler 17, an electronic control unit 19 and, advantageously, a flow meter 20 for checking the water flow rate. There may also be a solenoid valve 21 mounted between the boiler 17 and the extraction chamber 6 and a collecting basin 22 into which both the solenoid valve 21 and the pump 16 can discharge if necessary.

The electronic control unit 19 is equipped with an electronic memory and is operatively associated, on one side with the pump 16, with the boiler 17 and with the temperature measuring device 18 and on the other side with a selecting unit 23. The selecting unit 23, which is also part of the apparatus 1, allows selection of the types of beverage to be supplied and, in general, allows selection from at least two different types of beverages (that is to say, a choice of espresso coffee or American coffee).

The electronic control unit 19 is programmed to cause the supplying of a beverage according to the type of beverage indicated by the selecting unit 23 using at least corresponding data saved in the electronic memory.

In fact, for each type of beverage selectable using the selecting unit 23, saved in the electronic memory there are respective data which include a respective supplying start temperature value, a respective steady-state supplying temperature value, a respective total supplying time and a respective activation mode for the pump 16 during the respective total supplying time. It should be noticed that in the case of the first type of beverage the term "respective" will mean "first", in the case of the second type of beverage it will means "second", in the case of the "nth" type it will mean "nth". This will be the meaning to be attributed to the term "respective" hereinafter in this description.

The electronic control unit 19 is therefore programmed to cause the supplying of the respective type of beverage using the respective data for controlling the pump 16 and the boiler 17.

In any case, in accordance with this invention, the types of beverages selectable will always be at least two, that is to say, an espresso coffee (first type) and an American coffee (black coffee—second type). In line with this, hereinafter references to a first type will always mean espresso coffee, whilst references to a second type will mean American coffee.

In order to allow the supplying of two such different beverages, according to this invention the second supplying start temperature value is greater than the first supplying start temperature value, and the second total supplying time is greater than the first total supplying time. Furthermore, the first total supplying time comprises in sequence a pre-infusion time, a wait time and an infusion time. The first activation mode for the pump 16 comprises activating the pump 16 during the pre-infusion time and during the infusion time and not activating the pump 16 during the wait time. In contrast, the second activation mode comprises activating the pump 16 for the whole of the second supplying time. Moreover, the first activation mode comprises, during pump 16 activation, an electricity supply to the pump 16 with a first average power that is greater than the second average power used during pump 16 activation in the second activation mode.

According to the preferred embodiments, the first supplying start temperature value is equal to 90° C.±2° C., preferably to 91° C.±1° C., and the first steady-state supplying temperature value is also equal to 91° C.±2° C., preferably to 91° C.±1° C., whilst the second supplying start temperature value is equal to 97° C.±2° C., preferably to 98° C.±1° C. and in contrast the second steady-state supplying temperature value is equal to the first steady-state supplying temperature value.

As regards the power used for electrically powering the pump 16, preferably the first average power is between 30% and 60% greater than the second average power, that is to say, the second average power is equal to a value of between approximately 62.5% and 77% of the first average power.

As regards the supplying times, the first total supplying time is between 10 seconds and 30 seconds, whilst the second total supplying time is between 40 seconds and 180 seconds.

Advantageously, the pre-infusion time is between 1 second and 4 seconds, the wait time is between 2 seconds and 5 seconds and the infusion time is between 2 seconds and 10 seconds.

In general, the electronic control unit 19 is preferably programmed to activate the boiler 17 following measurement, by the temperature measuring device 18, of a temperature value that is less than a respective minimum value of interest, and to keep the boiler 17 activated until the temperature measured reaches a respective maximum value of interest.

In particular, whilst during the supplying of a beverage according to one of the types indicated by the selecting unit 23, the supplying start temperature value and the steady-state supplying temperature value are those dictated by the type of beverage selected, when supplying of a beverage is not in progress, the electronic control unit 19 is programmed to issue the command for activation and deactivation of the boiler 17 depending on the first steady-state supplying temperature value (in other words, when the apparatus 1 is switched on but is not supplying, the electronic control unit 19 is programmed to keep the apparatus 1 in a condition suitable for supplying an espresso coffee).

According to a preferred embodiment of this invention, the electronic control unit 19, after having received from the selecting unit 23 an indication to supply a beverage of the first type, is programmed to, in use, immediately start or not start the supplying of the beverage, depending on the temperature measured by the temperature measuring device 18.

In particular, if the temperature measured by the temperature measuring device 18 is equal to or greater than the first supplying start temperature value, the electronic control unit 19 is programmed to immediately start the supplying of the beverage. If, in contrast, the temperature measured by the temperature measuring device 18 is less than the first supplying start temperature, the electronic control unit 19 is programmed to first activate the boiler 17 for heating it until the temperature measured has become equal to or greater than the first supplying start temperature value; the electronic control unit 19 is programmed to only at that point start supplying the beverage.

Even after having received from the selecting unit 23 an indication to supply a beverage of the second type, the electronic control unit 19 is advantageously programmed to, in use, immediately start or not start the supplying of the beverage, depending on the temperature measured by the temperature measuring device 18, with a logic similar to that of the case of the first type of beverage just illustrated. In fact, in this case too, the electronic control unit 19 is advantageously programmed to immediately start the supplying of the beverage if the temperature measured by the temperature measuring device 18 is equal to or greater than the second supplying start temperature value. If, in contrast, the temperature measured by the temperature measuring device 18 is less than the second supplying start temperature, the electronic control unit 19 is advantageously programmed to first activate the boiler 17 and to keep it active until the temperature measured has become equal to or greater than the second supplying start temperature value; the electronic control unit 19 is programmed to only at that point start supplying the beverage.

Once the supplying of a beverage of a type indicated by the selecting unit 23 has started, the electronic control unit 19 is programmed to, in use, activate the boiler 17 when the temperature measured by the temperature measuring device 18 has become less than the respective steady-state temperature value by at least one respective predetermined lower deviation (advantageously equal to 1° C.) and to deactivate the boiler 17 when the temperature measured by the temperature measuring device 18 has become greater than the respective steady-state temperature value by at least one predetermined higher deviation (also advantageously equal to 1° C.).

As regards the more strictly structural aspects of the machine, although various technical solutions are possible, some are particularly preferred.

Figure 5:
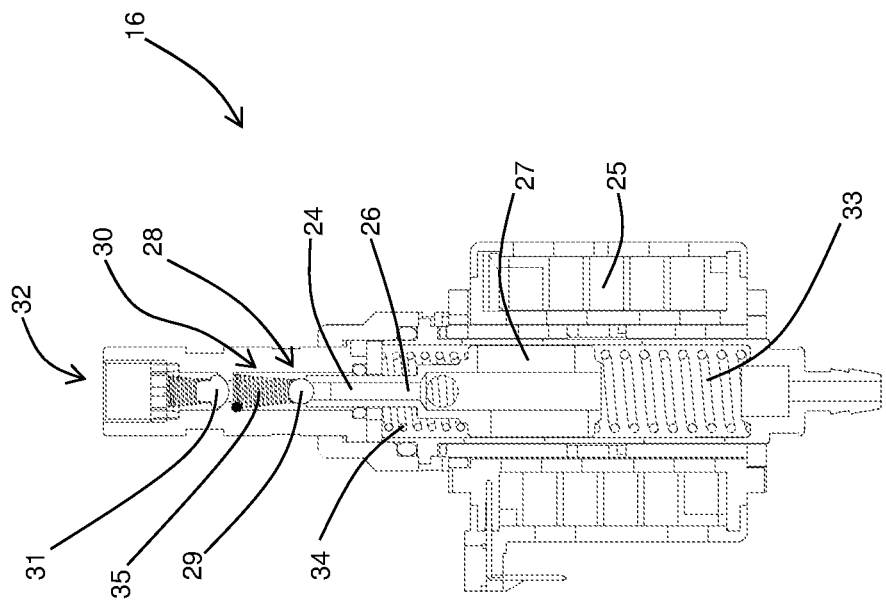
FIG. 5 is a cross-section of the pump of FIG. 4 according to the plane V-V.
Figure 4:
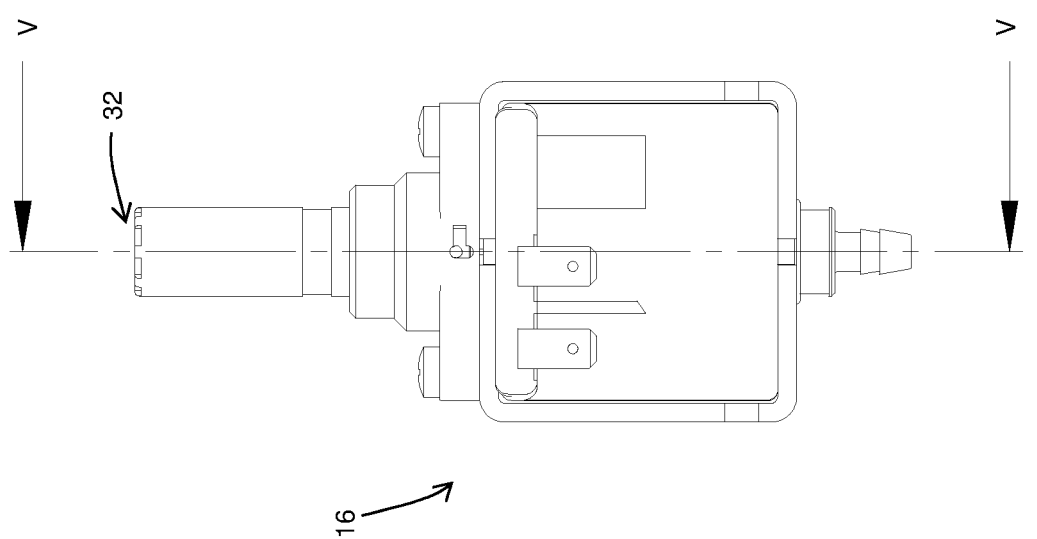
FIG. 4 is an enlarged view of a pump of the apparatus of FIG. 1.

Regarding the pump 16, the preferred solution comprises use of a vibration pump (also known as an oscillating piston pump 16) powered only with the positive half waves or negative half waves of an alternating voltage (usually with a frequency of between 50 Hz and 60 Hz), for example obtained with a simple diode positioned on the power supply circuit (not illustrated). It should be remembered that, in a pump 16 of this type, the piston 24 is made of (or comprises) a magnetic/ferromagnetic material coupled to a solenoid 25: powering the solenoid 25 causes shifting of the piston 24 in one direction, whilst a spring 33 connected to the self-same piston 24 returns it to the home condition when the solenoid 25 is not powered. In the embodiment illustrated in FIG. 5, in particular, the pump 16 comprises a hollow tubular element 26, open at both ends which is part of the piston 24 and which comprises a magnetic/ferromagnetic core 27. The hollow tubular element 26 has a delivery end 28 to which a first non-return valve 29 is joined which separates it from the pumping chamber 30 and which with the hollow tubular element 26 forms the piston 24. The latter is equipped, on an opposite side, with a second non-return valve 31 which separates it from the delivery outlet 32 of the pump 16. With reference to FIG. 5, the pump 16 operates as follows. In the absence of electrical power a main spring 33 holds the piston 24 pushed upwards, overcoming the resistance both of an auxiliary spring 34 and a first non-return spring 35 of the first non-return valve 29. When the solenoid 25 is powered, the piston 24 is drawn downwards again and a vacuum is created in the pumping chamber 30, causing water to be drawn into it (the first non-return valve 29 opens). When the electrical power ceases, the main spring 33 pushes the piston 24 into the pumping chamber 30; the first non-return valve 29 closes, whilst the second non-return valve 31 opens, allowing the water to be sent towards the extraction unit 5.

In particular, advantageously the pump 16 is powered by means of an electronic device for regulating or choking the electric power supply, able to choke the power supplied to the pump 16 by varying the power supply time, that is to say, by varying the time during which the half wave is actually supplied to the pump 16. As illustrated in FIG. 12 (with reference to the case of powering the pump 16 with only the positive half waves) this can be achieved by allowing supplying of the half wave to the pump 16 not at the moment when the voltage passes zero, but at a subsequent moment (FIG. 11 in contrast shows the case of powering with full power—it should be noticed that both FIG. 11 and FIG. 12 show the power supply voltage upstream of the diode).

As regards the boiler 17, preferably it is an instant boiler, advantageously of the type constituted of a metal body 36 enclosing a relatively long and narrow duct 37 in which the water to be heated flows and one or more electric heating elements 38 (in the coffee machine sector that type of boiler 17 is often referred to as an "exchanger" or "thermoblock" type)

As already indicated, in the simplest embodiment the apparatus 1 according to this invention has two types of beverages selectable by means of the selecting unit 23, espresso coffee and black coffee (or American coffee). However, in the more complex embodiments, the selecting unit 23 may also allow selection of one or more further types of beverages in addition to the first type and the second type, for each of which the respective supplying data will be saved in the electronic memory. By way of example, there may be long espresso coffee, tea, hot chocolate, hot milk, etc.

At a structural level, the selecting unit 23 may have any form suitable for the purpose. Therefore, it may comprise a plurality of push-buttons 39, one for each type of beverage selectable as shown for example in FIG. 1, or it may comprise an element switchable between a plurality of positions, each corresponding to one type of beverage selectable (solution not illustrated), or it may be constituted of a touch-screen display (solution not illustrated), or of a device for automatically recognising the capsule 3, 4 inserted in the extraction chamber 6 (in the latter case, also not illustrated, any prior art device of this type may be used). Whilst in the first three cases the type of beverage will be selected by the user, in the final case it will be selected automatically by the apparatus 1.

As indicated above, in addition to the apparatus 1 described so far, this invention also relates to the structure of the capsules 3, 4 to be used in the apparatus 1, and in particular the structure of the capsules 3, 4 for making two basic types of beverages, the capsules 3 for espresso coffee and the capsules 4 for black coffee.

The capsules 3 for making espresso coffee, illustrated in FIGS. 6 and 8 (hereinafter referred to as the first capsules 3), comprise first a cup-shaped first main body 40, having a first bottom wall 41, a first lateral wall 42, and a first upper flange 43 extending outwards from the first lateral wall 42, on a side opposite to that joined to the first bottom wall 41. Preferably the first main body 40 is a single piece constituted of an injection moulded plastic material, of a thermoformed multi-layered material with a barrier against oxygen, or of aluminium.

A first upper lid 44 is advantageously fixed to the first upper flange 43; preferably the first upper lid 44 is constituted of a plastic film with barrier or of aluminium.

At least one first filter 45 is positioned in the first main body 40 near the first bottom wall 41, and a first powdered food substance 2 is contained in the first main body 40 between the first lid 44 and the first filter 45 (the first filter 45 is therefore positioned in the first main body 40 between the first powdered food substance 2 and the first bottom wall 41).

The first powdered food substance 2 has a first nominal average particle size measurement advantageously less than 400 μm. Moreover, in particular, if the first food substance is intended for making espresso coffee it will advantageously have a nominal average particle size measurement greater than 270 μm.

Advantageously, but not necessarily, the first filter 45 is rigid or semi-rigid and is equipped with a plurality of first through openings of a size such that they retain particles having the first nominal average particle size measurement as well as, advantageously, particles having an average particle size measurement greater than or equal to 70%, preferably to 50%, of the first nominal average particle size measurement. Preferably, the first element 45 is bowl-shaped and has a first lower wall 46 and a first lateral containment wall 47 joined in a sealed fashion to the first lateral wall 42. The first openings may be made only on the first lower wall 46 or only on the first lateral containment wall 47, or on both.

Preferably, but not necessarily, the first capsule 3 comprises a pierced first distributing element 48 positioned between the first powdered food substance 2 and the first lid 44.

This invention may also be applied both in first capsules 3 able to contain exclusively a quantity of first powdered food substance 2 suitable for making a single beverage (usually approximately 8 g), or in larger first capsules 3 which may be filled with either a quantity of first powdered food substance 2 suitable for making a single beverage, or a quantity of first powdered food substance 2 suitable for making two beverages simultaneously (usually approximately 13 g). In order to guarantee good quality supplying in both cases, it is advantageously the case that when the first capsule 3 contains a quantity of first powdered food substance 2 suitable for making a single beverage, the first lower filter 45 or the first distributing element 48 are positioned further respectively from the first bottom wall 41 or from the first lid 44 than in the case in which the first capsule 3 contains a quantity of first powdered food substance 2 suitable for making two beverages, so as to adjust the space for containing the food substance to the quantity of food substance present.

The capsules for making black coffee, illustrated in FIGS. 7, 9 and 10 (hereinafter referred to as the second capsules 4), have a structure with many aspects similar to that of the first capsules 3. They comprise a second main body 49, a second upper lid 50, at least one second filter 51 and a second powdered food substance 2 contained in the second main body 49. In turn, the second main body 49 is cup-shaped and has a second bottom wall 52, a second lateral wall 53, and a second upper flange 54. The second upper lid 50 is fixed to the second upper flange 54, whilst the second filter 51 is mounted in the second main body 49 between the second powdered food substance 2 and the second bottom wall 52.

Again in this case, there may advantageously be a second distributing element 55 and the second capsule 4 may contain a quantity of second powdered food substance 2 suitable for making either a single beverage or two beverages simultaneously.

The second powdered food substance 2 has a second nominal average particle size measurement, advantageously greater than 600 µm. Moreover, in particular, if the second food substance is intended for making American coffee it will advantageously have a nominal average particle size measurement greater than 600 µm.

For the second capsules 4 what is described above relative to the first capsules 3 again applies, except for the differences indicated below.

First, the second filter 51 comprises a first filtering element 56, rigid or semi-rigid, equipped with a plurality of second through openings (therefore, structurally similar to the first filter 45) and a second, flexible filtering element 57 coupled to the first filtering element 56 and positioned between the first filtering element 56 and the second powdered food substance 2.

Advantageously, the second, flexible filtering element 57 is constituted of a layer of needle punched polyester, with a weight per unit of surface area of between 80 and 150 g/m2, or of another material with similar performance, and which has a porosity of between 0.6 and 0.9, and an air permeability measured at 200 Pa at 20° C. of between 800 and 1500 l/dm2·min.

The first filtering element 56 is also equipped with a plurality of second through openings, of a size such that they retain particles having the second nominal average particle size measurement as well as, preferably, particles having an average particle size measurement equal to 50% of the second nominal average particle size measurement.

The first filtering element 56 is advantageously bowl-shaped and comprises a second lower wall 58 and a second lateral containment wall 59 coupled in a sealed way to the second lateral wall 53. The second openings are advantageously made on both the second lower wall 58 and on the second lateral containment wall 59.

Preferably, both the first filter 45 and the first filtering element 56 of the second filter 51 have on the outer side of the bowl that they form, raised elements 60 suitable for holding them spaced from the respective main body 40, 49 and for forming a space for passage of the beverage between the respective filter 45, 51 and the respective main body 40, 49 (preferably both at the bottom and at the side).

Moreover, preferably, both the first through openings and the second through openings are in the shape of slots.

In the preferred embodiments, the second, flexible filtering element 57 at least internally covers the bowl formed by the rigid first filtering element 56 to which it is advantageously annularly sealed one or more times (preferably at the top and at the central zone of the second lower wall 58).

Moreover, according to this invention, in the second capsules 4 at least part of the second bottom wall 52 has a resistance to tearing which is less than that of the lateral wall. That is advantageously achieved by making the second lateral wall 53 and if necessary part of the second bottom wall 52 similarly to what is described above for the whole of the first main body 40, and making at least the part of the second bottom wall 52 which must have a resistance to tearing which is less than that of the second lateral wall 53, either using a single-layer or multi-layer sheet comprising a layer of aluminium or of plastic material (advantageously PET).

Depending on the design choices, this way can be used to make either the entire second bottom wall 52 (solution not illustrated) or only an insert 61 positioned in such a way as to close a hole 62 present in the second bottom wall 52 (solution clearly visible in FIG. 10). Advantageously, the single-layer or multi-layer sheet will therefore be glued or sealed to the rest of the bottom wall 41 or to the lateral wall 53.

A further difference between the first capsule 3 and the second capsule 4 relates to the powdered food substance 2. In fact, the first nominal average particle size measurement is advantageously less than the second nominal average particle size measurement.

In the known way, each capsule 3, 4 may also bear identification, where the apparatus 1 for which it is intended is fitted with a selecting unit 23 based on automatic recognition of the capsule 3, 4.

Finally, there may even be further types of capsules for making further types of beverages. Each further type of capsule may have structural aspects in common with the first capsule 3 or with the second capsule 4. In contrast, in general, the characteristics of the powdered food substances contained in them will be different. For example, if the powdered food substance is intended for making long espresso coffee it will advantageously have a nominal average particle size measurement greater than 350 µm, whilst if it is intended for making filter coffee it will advantageously have a nominal average particle size measurement greater than 540 µm.

Finally, this invention also relates the combination of an apparatus 1 of the type described above with at least one first capsule 3 and one second capsule 4, wherein the first capsule 3 and the second capsule 4 have external dimensions which are substantially the same and they differ from one another internally as indicated above.

According to this invention, the apparatus 1 and the first capsule 3 are made in such a way that when the pump 16 is activated according to the first activation mode with a first capsule 3 inserted in the extraction chamber 6, this causes the formation in the feeding duct of an overpressure compared with atmospheric pressure equal to at least 4 bar. In contrast, the apparatus 1 and the second capsule 4 are made in such a way that when the pump 16 is activated in accordance with the second activation mode with a second capsule 4 inserted in the extraction chamber 6, this causes the formation in the feeding duct 15 of an overpressure compared with atmospheric pressure of less than 2 bar.

Furthermore, the apparatus 1 and, respectively, the first capsule 3 and the second capsule 4, are made in such a way that, when the pump 16 is activated in accordance with the first activation mode, with a first capsule 3 inserted in the extraction chamber 6, during the first supplying time a quantity of between 15 ml and 50 ml of beverage is supplied, preferably between 20 ml and 40 ml and, when the pump 16 is activated in accordance with the second activation mode, with a second capsule 4 inserted in the extraction chamber 6, during the second supplying time a quantity of beverage greater than 180 ml is supplied, preferably between 180 ml and 400 ml.

Obviously, by using two or more capsules 3, 4 in series it is possible to make larger quantities of beverage.

Operation of both the apparatus 1 and of the combination of the apparatus and the capsules 3, 4 immediately relates to the structural description above. This invention brings important advantages.

First, thanks to this invention it has been possible to provide an apparatus for making a beverage, as well as a combination of the apparatus and of at least two different capsules, which allow both espresso coffee and black coffee to be made as required, both having optimum oganoleptic properties.

In particular, thanks to this invention a capsule for making a beverage has been provided which is less subject to the risk of also supplying for a short time plain hot water rather than coffee compared to corresponding capsules currently on sale.

Finally, it should be noticed that this invention is relatively easy to produce and that even the cost linked to implementing the invention is not very high.

The invention described above may be modified and adapted in several ways without thereby departing from the scope of the inventive concept.

All details may be substituted with other technically equivalent elements and the materials used, as well as the shapes and dimensions of the various components, may vary according to requirements.

The invention claimed is:

1. An apparatus for making a beverage by passing hot water through a powdered food substance (2) contained in a capsule (3), (4), comprising:
    an extraction unit (5) which comprises an extraction chamber (6) and which is switchable between an open configuration in which in use the extraction unit (5) allows a capsule (3), (4) to be inserted in or extracted from the extraction chamber (6), and a closed configuration in which in use the extraction unit (5) can retain a capsule (3), (4) in the extraction chamber (6);
    hot water feeding means for feeding hot water to the extraction chamber (6);
    evacuating means for evacuating a beverage from the extraction chamber (6); and
    a selecting unit (23) for selecting from at least two different types of beverages;
    the hot water feeding means in turn comprising a tank (14), a feeding duct (15) extending from the tank (14) to the extraction chamber (6), a pump (16) mounted in the feeding duct (15), a boiler (17) mounted along the feeding duct (15) downstream of the tank (14), a temperature measuring device (18) associated with the boiler (17), and an electronic control unit (19) equipped with an electronic memory and operatively associated on one side with the pump (16), with the boiler (17) and with the temperature measuring device (18) and on the other side with the selecting unit (23), for causing the supplying of a beverage in accordance with a type indicated by the selecting unit (23);
    wherein
    for a first type of beverage selectable using the selecting unit (23), saved in the electronic memory there are first data which include a first supplying start temperature value, a first steady-state supplying temperature value, a first total supplying time and a first activation mode for the pump (16) during the first total supplying time;
    for a second type of beverage selectable using the selecting unit (23), saved in the electronic memory there are second data which include a second steady-state supplying temperature value, a second supplying start temperature value that is greater than the first supplying start temperature value, a second total supplying time that is greater than the first total supplying time and a second activation mode for the pump (16) during the second total supplying time; and
    the electronic control unit (19) is programmed to cause the supplying of the first type of beverage using the first data for controlling the pump (16) and the boiler (17), and to cause the supplying of the second type of beverage using the second data for controlling the pump (16) and the boiler (17);
    and wherein:
    the first total supplying time comprises in sequence a pre-infusion time, a wait time and an infusion time;
    the first activation mode for the pump (16) comprises activating the pump (16) during the pre-infusion time and the infusion time and not activating the pump (16) during the wait time;
    the second activation mode comprises activating the pump (16) for the whole of the second supplying time; and
    the first activation mode comprises, during pump (16) activation, an electricity supply to the pump (16) with a first average power that is greater than a second average power used during pump (16) activation in the second activation mode.

2. The apparatus according to claim 1, wherein the electronic control unit (19), after having received from the selecting unit (23) an indication to supply a beverage of the first type, is programmed to, in use:
    immediately start the supplying of the beverage if the temperature measured by the temperature measuring device (18) is greater than or equal to the first supplying start temperature value;
    first activate the boiler (17) if the temperature measured by the temperature measuring device (18) is less than the first supplying start temperature value, until the temperature measured has become greater than or equal to the first supplying start temperature value and then start the supplying of the beverage.

3. The apparatus according to claim 1, wherein the electronic control unit (19), after having received from the selecting unit (23) an indication to supply a beverage of the second type, is programmed to, in use:
    immediately start the supplying of the beverage if the temperature measured by the temperature measuring device (18) is greater than or equal to the second supplying start temperature value;
    first activate the boiler (17) if the temperature measured by the temperature measuring device (18) is less than the second steady-state supplying temperature value, until the temperature measured has become greater than the second supplying start temperature value and then start the supplying of the beverage.

4. The apparatus according to claim 1, wherein the electronic control unit (19) is programmed to, in use, activate the boiler (17) during the supplying of a beverage of a type indicated by the selecting unit (23), when the temperature measured by the temperature measuring device (18) has become less than the respective steady-state supplying temperature value by at least one respective predetermined lower deviation and to deactivate the boiler (17) when the temperature measured by the temperature measuring device (18) has become greater than the respective steady-state supplying temperature value by at least one predetermined higher deviation.

5. The apparatus according to claim 1, wherein the first steady-state supplying temperature value is equal to the second steady-state supplying temperature value.

6. The apparatus according to claim 1, wherein the electronic control unit (19) is programmed to, in use, activate the boiler (17) when the supplying of a beverage is not in progress, when the temperature measured by the temperature measuring device (18) is less than the first supplying start temperature value by at least one respective predetermined lower deviation and to deactivate the boiler (17) when the temperature measured by the temperature measuring device (18) is greater than the first steady-state supplying temperature value by at least one predetermined higher deviation.

7. The apparatus according to claim 1, wherein the electronic control unit (19) is programmed to, in use, raise the first supplying start temperature value and the second supplying start temperature value by a predetermined overheating deviation when the command for a first supplying of a beverage is issued after switching on the machine and/or after a predetermined time since the last supplying of a beverage.

8. The apparatus according to claim 1, wherein the pump (16) is a vibration pump.

9. The apparatus according to claim 1, wherein the pump (16) is powered with only the positive half waves or with only the negative half waves of an alternating voltage.

10. The apparatus according to claim 1, also comprising an electronic device for choking the electric power supply of the pump (16) which chokes the power supply to the pump (16), varying the power supply time.

11. The apparatus according to claim 1, wherein the boiler (17) is an instant boiler.

12. The apparatus according to claim 1, wherein the first average power is between 30% and 60% greater than the second average power.

13. The apparatus according to claim 1, wherein the first total supplying time is between 10 seconds and 30 seconds.

14. The apparatus according to claim 1, wherein the second total supplying time is between 40 seconds and 180 seconds.

15. The apparatus according to claim 1, wherein the first supplying start temperature value is equal to 90° C.±2° C. and the first steady-state supplying temperature value is equal to 90° C.±2° C.

16. The apparatus according to claim 1, wherein the second supplying start temperature value is equal to 97° C.±2° C. and the second steady-state supplying temperature value is equal to 91° C.±2° C.

17. The apparatus according to claim 1, wherein the pre-infusion time is between 1 second and 4 seconds, the wait time is between 2 seconds and 5 seconds and the infusion time is between 2 seconds and 10 seconds.

18. The apparatus according to claim 1, wherein the selecting unit (23) comprises either a plurality of push-buttons (39), one for each type of beverage selectable, or an element switchable between a plurality of positions, each corresponding to one type of beverage selectable, or a touch screen display, or a device for automatically recognising a capsule (3), (4) inserted in the extraction chamber (6).

19. The apparatus according to claim 1, wherein the selecting unit (23) also allows the selection of one or more further types of beverages in addition to the first type and the second type, and wherein for each further type of beverage selectable using the selecting unit (23), saved in the electronic memory there are the respective data which include a respective supplying start temperature value, a respective steady-state supplying temperature value, a respective total supplying time and a respective activation mode for the pump (16) during the respective total supplying time.

20. A combination of an apparatus according to claim 1 and at least a first capsule (3) comprising a first powdered food substance (2) and a second capsule (4) comprising a second powdered food substance (2), wherein:
the first capsule (3) and the second capsule (4) have substantially the same external dimensions and differ from one another internally;
activation of the pump (16) in accordance with the first activation mode with a first capsule (3) inserted in the extraction chamber (6), causes the formation in the feeding duct (15) of an overpressure compared with atmospheric pressure equal to at least 4 bar; and
activation of the pump (16) in accordance with the second activation mode with a second capsule (4) inserted in the extraction chamber (6), causes the formation in the feeding duct (15) of an overpressure compared with atmospheric pressure of less than 2 bar.

21. The combination according to claim 20, wherein the first powdered food substance (2) has a first average particle size measurement that is less than a second average particle size measurement of the second powdered food substance (2).

22. The combination according to claim 20, wherein both the first capsule (3) and the second capsule (4) comprise a main body, an upper lid and at least one filter, wherein the main body is cup-shaped, and comprises a bottom wall, a lateral wall, and an upper flange, wherein the upper lid is fixed to the upper flange, wherein the filter is mounted in the main body between the food substance and the bottom wall, wherein the filter of the second capsule (4) comprises a first filtering element (56), rigid or semi-rigid, equipped with a plurality of through openings and a second, flexible filtering element (57) coupled to the first filtering element (56) and positioned between the first filtering element (56) and the second powdered food substance (2).

23. The combination according to claim 22, wherein the second, flexible filtering element (57) is constituted of a layer of needle punched polyester, with a weight per unit of surface area of between 80 and 150 g/m², a porosity of between 0.6 and 0.9, and an air permeability measured at 200 Pa at 20° C. of between 800 and 1500 I/dm²·min.

24. The combination according to claim 23, wherein at least part of the bottom wall of the second capsule (4) has a resistance to tearing that is less than the resistance to tearing of the lateral wall of the second capsule (4).

25. The combination according to claim 20, wherein the first filtering element (56) is bowl-shaped and comprises a lower wall and a lateral containment wall, said openings being made both on said lower wall and on said lateral containment wall, and said second, flexible filtering element (57) at least internally covering the bowl formed by the first filtering element (56).

26. The combination according to claim 20, wherein when the pump (16) is activated in accordance with the first activation mode, with a first capsule (3) inserted in the extraction chamber (6) and for the entire first supplying time, a quantity of between 15 ml and 50 ml of beverage is supplied, and wherein when the pump (16) is activated in accordance with the second activation mode, with a second capsule (4) in the extraction chamber (6) and for the entire second supplying time, a quantity of beverage greater than 180 ml is supplied.

* * * * *